US008818802B2

(12) United States Patent
Fastow et al.

(10) Patent No.: US 8,818,802 B2
(45) Date of Patent: Aug. 26, 2014

(54) REAL-TIME DATA PATTERN ANALYSIS SYSTEM AND METHOD OF OPERATION THEREOF

(75) Inventors: Richard Fastow, Cupertino, CA (US); Qamrul Hasan, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 688 days.

(21) Appl. No.: 12/852,970

(22) Filed: Aug. 9, 2010

(65) Prior Publication Data
US 2011/0082694 A1 Apr. 7, 2011

Related U.S. Application Data

(63) Continuation of application No. PCT/US2009/059862, filed on Oct. 7, 2009.

(60) Provisional application No. 61/195,743, filed on Oct. 10, 2008.

(51) Int. Cl.
*G10L 15/00* (2013.01)

(52) U.S. Cl.
USPC ........ 704/231; 704/270; 704/257; 704/256.6; 704/256.4; 704/256; 704/255; 704/254; 704/253; 704/235; 704/233; 455/563; 375/243

(58) Field of Classification Search
USPC ........... 704/233, 270, 256.6, 257, 256.4, 256, 704/255, 254, 253, 235; 455/563; 375/243
See application file for complete search history.

(56) References Cited

U.S. PATENT DOCUMENTS 5,164,990 A * 11/1992 Pazienti et al. ................ 704/253
5,487,086 A * 1/1996 Bhaskar ........................ 375/243
(Continued)

FOREIGN PATENT DOCUMENTS

DE 197 44 690 A1 4/1999
JP 60-168196 A 8/1985
(Continued)

OTHER PUBLICATIONS

Kimura, T., et al., "A Single Chip Self-Contained Speech Recognizer," *IEEE Journal of Solid-State Circuits:SC*-18(3): 344-349 (1983).
(Continued)

*Primary Examiner* — Michael Colucci
(74) *Attorney, Agent, or Firm* — Sterne, Kessler, Goldstein & Fox PLLC

(57) ABSTRACT

A method for real-time data-pattern analysis. The method includes receiving and queuing at least one data-pattern analysis request by a data-pattern analysis unit controller. At least one data stream portion is also received and stored by the data-pattern analysis unit controller, each data stream portion corresponding to a received data-pattern analysis request. Next, a received data-pattern analysis request is selected by the data-pattern analysis unit controller along with a corresponding data stream portion. A data-pattern analysis is performed based on the selected data-pattern analysis request and the corresponding data stream portion, wherein the data-pattern analysis is performed by one of a plurality of data-pattern analysis units.

27 Claims, 8 Drawing Sheets

(56) References Cited

U.S. PATENT DOCUMENTS

| | | | |
|---|---|---|---|
| 5,535,305 A * | 7/1996 | Acero et al. | 704/256 |
| 5,539,859 A * | 7/1996 | Robbe et al. | 704/233 |
| 5,710,866 A * | 1/1998 | Alleva et al. | 704/256.4 |
| 5,794,197 A * | 8/1998 | Alleva et al. | 704/255 |
| 6,024,580 A | 2/2000 | Dangler et al. | |
| 6,425,064 B2 | 7/2002 | Soderquist | |
| 6,490,559 B2 | 12/2002 | Budde et al. | |
| 6,725,063 B2 * | 4/2004 | Choi | 455/563 |
| 7,228,275 B1 * | 6/2007 | Endo et al. | 704/235 |
| 7,609,083 B2 | 10/2009 | Fuseya | |
| 8,352,265 B1 * | 1/2013 | Lin et al. | 704/256.6 |
| 2001/0056350 A1 * | 12/2001 | Calderone et al. | 704/270 |
| 2003/0110033 A1 | 6/2003 | Sheikhzadeh-Nadjar et al. | |
| 2007/0192109 A1 | 8/2007 | Likens et al. | |
| 2007/0288242 A1 | 12/2007 | Spengler et al. | |
| 2008/0221893 A1 * | 9/2008 | Kaiser | 704/257 |
| 2008/0255839 A1 | 10/2008 | Larri et al. | |
| 2009/0234651 A1 * | 9/2009 | Basir et al. | 704/254 |
| 2010/0276572 A1 | 11/2010 | Iwabuchi et al. | |
| 2011/0208519 A1 | 8/2011 | Fastow | |

FOREIGN PATENT DOCUMENTS

| | | |
|---|---|---|
| JP | 6-167995 A | 6/1994 |
| JP | 2007-335076 A | 12/2007 |
| WO | WO 2006/129762 A1 | 12/2006 |

OTHER PUBLICATIONS

Krishna, R., et al., "Memory System Design Space Exploration for Low-Power, Real-Time Speech Recognition," JSSS-CODES '04:140-145, Advanced Computer Architecture Lab, University of Michigan (Ann Arbor) (2004).

Pawate, B.I. (Raj) and Robinson, P.D., "Implementation of an HMM-Based, Speaker-Independent Speech Recognition System on the TMS320C2x and TMS320C5x," Speech and Image Understanding Laboratory, Computer Sciences Center, Texas Instruments Incorporated (1996).

Schuster, J., et al, "Speech Silicon: An FPGA Architecture for Real-Time Hidden Markov-Model-Based Speech Recognition," *EURASIP Journal on Embedded Systems 2006*:1-19, Hindawi Publishing Corporation (2006).

International Search Report for International Application No. PCT/US2009/059862.

Non-Final Office Action for U.S. Appl. No. 13/123,698, mailed Nov. 6, 2013; 8 pages.

English-language translation of German-language Office Action for German Patent Application No. 11 2009 002 426, mailed Feb. 6, 2012; 2 pages.

English-language translation of Japanese-language Office Action for Japanese Application No. 2011-531145, mailed Dec. 3, 2013; 3 pages.

English-Language Abstract of Japanese Patent Application Publication JP 6-167995 A; 1 page.

* cited by examiner

REAL-TIME DATA PATTERN ANALYSIS SYSTEM AND METHOD OF OPERATION THEREOF

CROSS-REFERENCE TO RELATED APPLICATIONS

This application claims the benefit of Application serial No. PCT/US2009/059862, filed Oct. 7, 2009, which claims the benefit of U.S. Provisional Patent Application Ser. No. 61/195,743, filed Oct. 10, 2008, and the subject matter thereof is incorporated herein by reference thereto.

TECHNICAL FIELD

The present invention relates generally to a real-time data pattern analysis system, and more particularly to a system for speech recognition.

BACKGROUND

Real-time data pattern recognition is increasingly used to analyze data streams in the process of controlling small and networked electronic systems. For example, speech recognition systems are increasingly common in the mobile, server, and PC markets. On the low end of the capability spectrum, speech recognition systems need to recognize connected digits (vocabulary of 10) or alphabet letters (vocabulary of 26). While on the high end of the spectrum, a 65,000 word continuous dictation capability may be necessary. If grammatical models are also included then a 13,000,000 trigram language model could be required. The word error rate in speech recognition systems is significantly higher than for human speech recognition. In some cases (in particular in noisy environments) machine speech recognitions systems may have an order of magnitude higher error rate than a human listener. Large vocabulary speech recognition systems are typically composed of a signal processing stage (feature extractor) followed by an acoustic modeling stage (senone calculator), followed by a phoneme evaluator (Viterbi search) and a word modeler.

In the signal processing stage, techniques such as linear predictive coding (LPC) or fast fourier transforms (FFT) are applied in order to extract a parametric digital representation of the incoming signal. This procedure is repeated at regular time intervals, or frames, of approximately 10 ms. In the acoustic modeling stage, these parametric observation vectors are then compared to the senones stored in memory (the term "senone" denotes a basic subphonetic unit). The comparison of the parametric observation vector with the senones is a computation and memory intensive task, as up to 20,000 senones are compared every 10 ms. During this comparison, a multivariate Gaussian probability may be calculated for each senone, and represents the mathematical "distance" between the incoming feature vector and each of the stored senones.

In the phoneme evaluation stage, Hidden Markov Models (HMMs) may be used to model phonemes as a sequences of senones, where specific senones are probabilistically associated with a state in an HMM. For a given observed sequence of senones, there is a most likely sequence of states in a corresponding HMM. This corresponding HMM is then associated with the observed phoneme. In order to find the most likely phoneme corresponding to a sequence of senones, the Viterbi algorithm is often employed.

The Viterbi algorithm performs a computation which starts at the first frame and then proceeds one frame at a time, in a time-synchronous manner. A probability score is computed for each senone in the HMMs being considered. Therefore, a cumulative probability score is successively computed for each of the possible senone sequences as the Viterbi algorithm analyzes the sequential observation vectors. By the end of an utterance, the HMM having the highest probability score computed by the Viterbi algorithm provides the most likely phoneme for the entire sequence.

The acoustic modeling stage is the computational bottleneck of the speech recognition process. This is due to two factors: 1) the large number of floating point calculations required to evaluate the multivariate Gaussian probabilities of each senone, and 2) the memory bandwidth limitations of accessing the senone data. Evaluation of a standard SPHINX3 speech recognition system on a 1.7 GHz x86 microprocessor based platform showed that a 1000-word task took 160% longer than real time to process and consumed a significant portion of the memory bus bandwidth. This bottleneck severely restricts the ability of mobile appliances to run large vocabulary speech recognition software with a similar architecture, due to the slower processing speed and reduced power requirements of mobile processors.

Issues with the speed and storage/processing capabilities of speech recognition systems exemplify complexities associated with analyzing data streams in real-time or close to real time. Thus the problems associated with speech recognition may be generalized to the analysis to other data streams ranging from streaming media to the analysis of signal behavior in smart utility networks.

Thus, a need still remains for systems and methods for reducing bottlenecks in the analysis of data patterns in electronic and networked systems such as speech recognition systems used in cell phones. In view of the increasing need for real-time data analysis in the control of electronic devices and networks, it is increasingly critical that answers be found to these problems. Additionally, the need to reduce costs, improve efficiencies and performance, and meet competitive pressures adds an urgency to the critical necessity for finding answers to these problems. Solutions to these problems have been long sought but prior developments have not taught or suggested practical or compelling solutions and, thus, solutions to these problems have long eluded those skilled in the art.

SUMMARY OF THE INVENTION

This present invention provides a solution to the challenges inherent in real-time data analysis in the control of electronic devices and networks. In a method according to one embodiment, a series of steps provide real-time data-pattern analysis. At least one data-pattern analysis request is received and queued by a data-pattern analysis unit controller. Additionally, at least one data stream portion is also received and stored by the data-pattern analysis unit controller, each data stream portion corresponding to a received data-pattern analysis request. A received data-pattern analysis request and corresponding data stream portion is selected by the data-pattern analysis unit controller. A data-pattern analysis is performed on the corresponding data stream portion based on the selected data-pattern analysis request, wherein the data-pattern analysis is performed by one of a plurality of data-pattern analysis units.

A system according to another embodiment of the present invention provides real-time data-pattern analysis. The system includes a data-pattern analysis unit controller, and a plurality of data-pattern analysis units communicatively coupled in parallel to the data-pattern analysis unit controller.

The data-pattern analysis unit controller receives at least one data-pattern analysis request and at least one corresponding data stream portion. Further, the data-pattern analysis unit controller selects a received data-pattern analysis request and a corresponding data stream portion and sends the selected data-pattern analysis request and the corresponding data stream portion to a selected data-pattern analysis unit. The selected data-pattern analysis unit performs a data-pattern analysis on the data stream portion based upon the selected data-pattern analysis request.

In a method according to another embodiment of the present invention, a series of steps provide senone scoring. At least one senone scoring request is received. Additionally, at least one data stream portion is also received, each data stream portion corresponding to a received senone scoring request. A received senone scoring request and corresponding data stream portion is selected. A senone score is determined based on the selected senone scoring request and the corresponding data stream portion. In one embodiment the at least one data stream portion and at least one senone scoring request are received by a senone scoring unit controller. In another embodiment, a selected senone scoring unit from a plurality of senone scoring units determines the senone score based the selected senone scoring request and the corresponding data stream portion.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Figure 1:
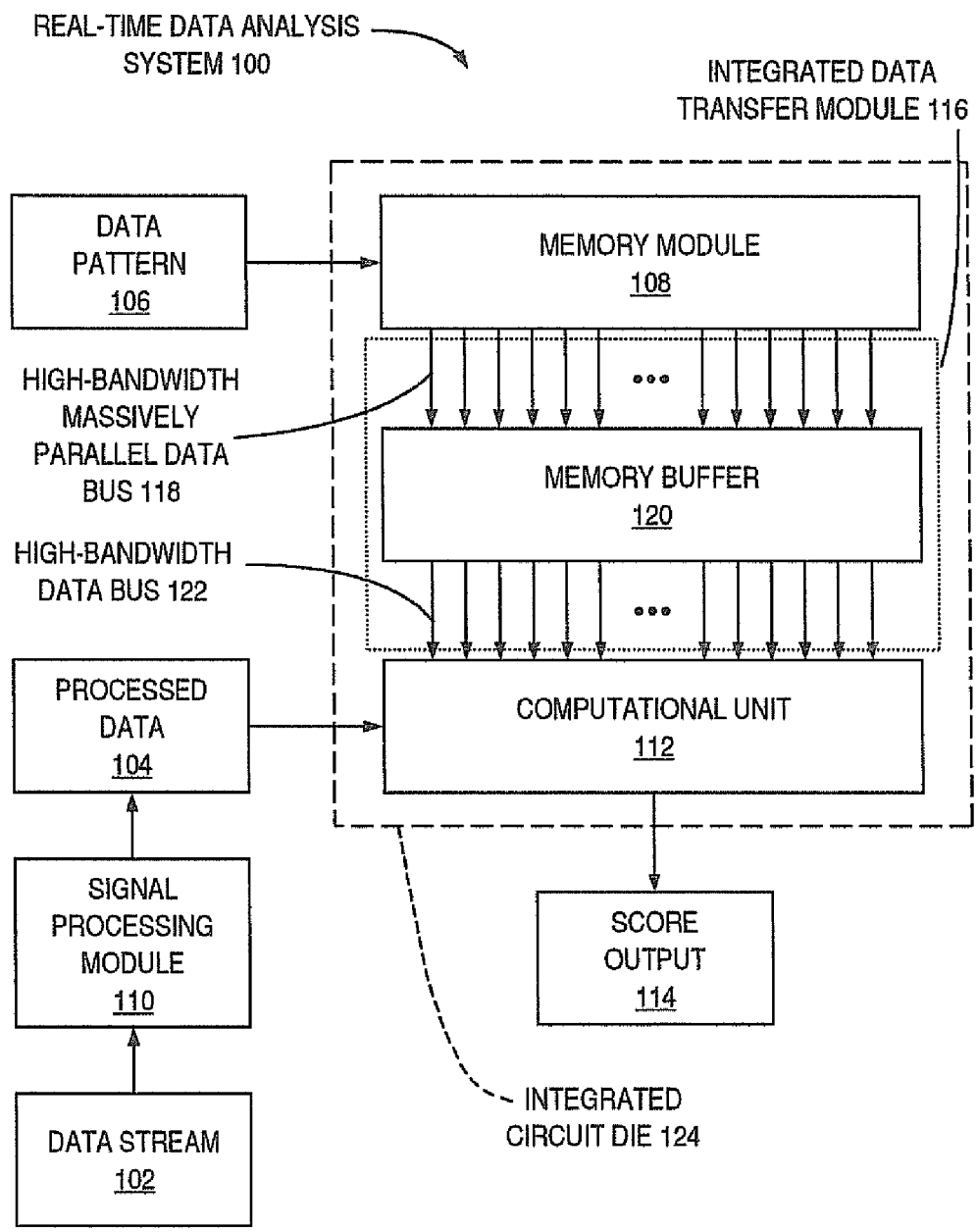
FIG. 1 is a schematic block diagram illustrating a real-time data-pattern analysis system in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

This present invention provides a solution to the increasing challenges inherent in analysis of data patterns in electronic and networked systems such as speech recognition systems. Various embodiments of the present disclosure provide a data-pattern analysis unit controller and a plurality of data-pattern analysis units coupled in parallel to the data-pattern analysis unit. In one embodiment a data-pattern analysis unit is a senone scoring unit for speech recognition processing. As discussed in detail below, the data-pattern analysis unit controller and a plurality of data-pattern analysis units allow for simultaneous processing of multiple data streams to allow real-time to near real-time analysis.

Referring now to FIG. 1, a schematic block diagram illustrates a real-time data-pattern analysis system 100 in an embodiment of the present invention. The architecture of the real-time data-pattern analysis system 100 is optimized to provide real-time analysis of a data stream 102 by comparing processed data 104 originating from the data stream 102 to a data pattern 106 stored in a memory module 108, which may be implemented using volatile memory such as a DRAM or non-volatile memory such as Flash memory. In an exemplary embodiment of the invention, the memory module 108 is implemented using non-volatile memory. Examples of non-volatile memory include NOR flash memory, NAND flash memory, phase change memory, resistive memory, magnetic RAM memory, or FERAM memory, among many other options.

The real-time data-pattern analysis system 100 may include a signal processing module 110 for converting the data stream 102 to the processed data 104. Signal processing functions carried out by the signal processing module 110 may include analog-to-digital conversion, conversion from the time domain to the frequency domain, and/or any other signal manipulation that results in the appropriate conversion of the data stream 102 into the processed data 104 that can be compared to the data pattern 106.

A computational unit 112 computes a comparison between the processed data 104 and the data pattern 106, producing a score output 114 that quantifies pattern matching between the processed data 104 and the data pattern 106. In performing such comparison, the computational unit 112 must compare the processed data 104 to a plurality of different variations of the data pattern 106 residing in the memory module 108. In one embodiment the comparison performed by the computational unit 112 is the calculation of the Mahalanobis distance between the processed data 104 and the data pattern 106, representing a likelihood for each instance of the data pattern 106 stored in the memory module 108.

The transfer of the data pattern 106 from the memory module 108 to the computational unit 112 is implemented using an integrated data transfer module 116 which may include a high-bandwidth massively parallel data bus 118, a memory buffer 120, and a high-bandwidth data bus 122. The rate-limiting step in the implementation of the real-time data-pattern analysis system 100 is data transfer between the memory module 108 and the computational unit 112. For this reason, a key aspect of the real-time data-pattern analysis system 100 is the integration of the memory module 108, the integrated data transfer module 116, and the computational unit 112 within an integrated circuit die 124. In an alternate embodiment, the signal processing module 110 is also integrated within the integrated circuit die 124.

The integration of the of the memory module 108, the integrated data transfer module 114, and the computational unit 112 within the integrated circuit die 124 enables implementation of the integrated data transfer module 114 in a way that maximizes interconnections while minimizing parasitics that may corrupt data transfer. In a non-integrated configuration of a data pattern analysis system, data bus width between the memory module 108 and the computational unit 112 would be limited to the number of input/output contact pads available, which may range from 8 to 32 bits. In contrast, the implementation of the integrated data transfer module 114 within the integrated circuit die 124 enables a bus width exceeding 256 bits, directly translating into data transfer rates between the memory module 108 and the computational unit 112 exceeding 1 gigabyte per second.

The real-time data-pattern analysis system 100 may be employed for the real-time or close to real-time analysis of the data stream 102 that may be voice data, multi-media streaming data, or any data transmitted through a grid or network that requires analysis. For example, the real-time data-pattern analysis system 100 may be employed to recognize data signatures within a power transmission grid or local power circuitry, wherein the data signatures indicate anomalies or operation of a certain device within the grid or network.

Further, multiple instances of the real-time data-pattern analysis system 100 may be used in parallel, providing scalability depending on the complexity of the data stream 102. For parallel use of the real-time data-pattern analysis system 100 (described in detail below), additional modules manage the data stream 102 and coordinate the function between instances of the real-time data-pattern analysis system 100.

Figure 2:
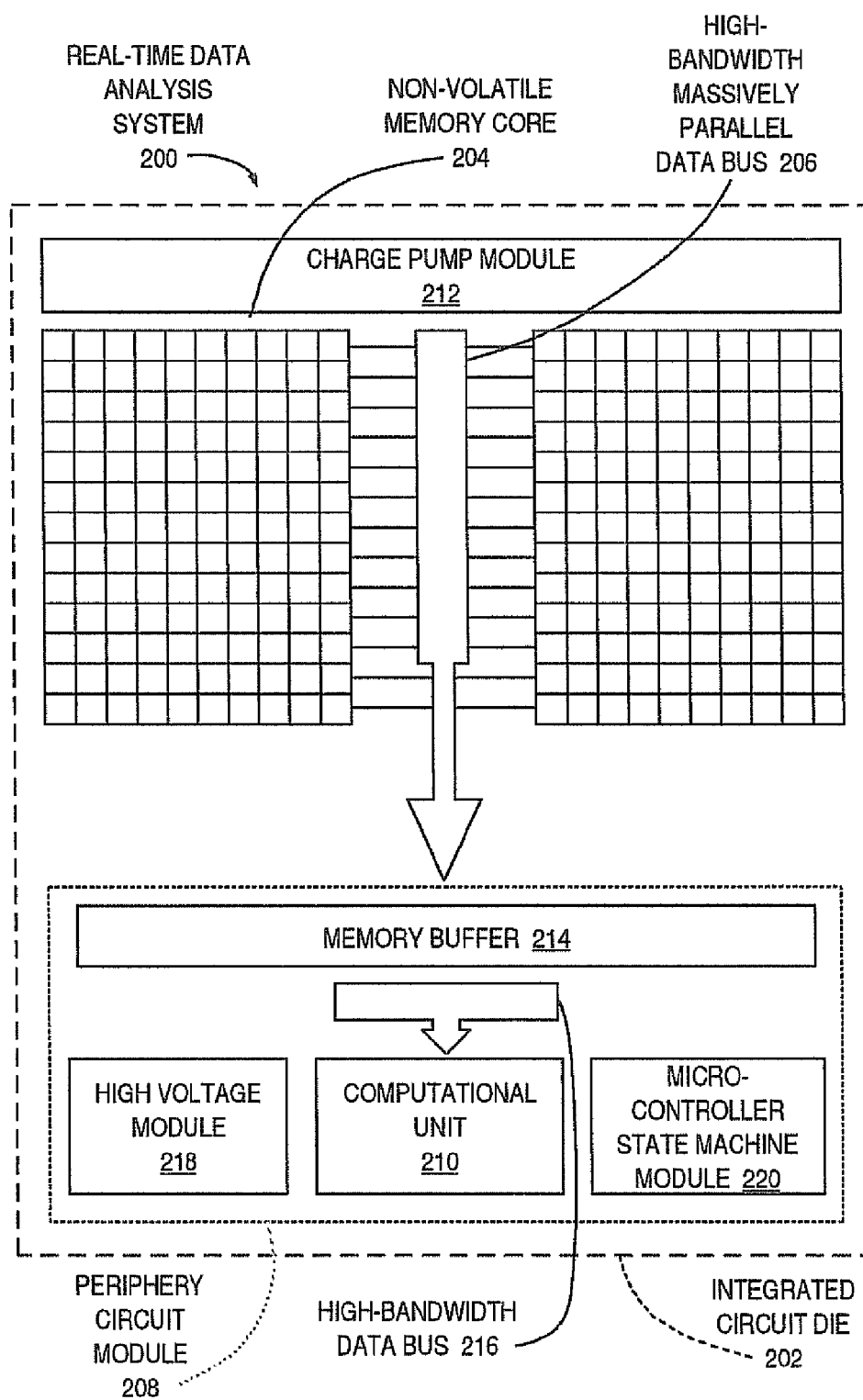
FIG. 2 is a schematic representation of the floor plan of a real-time data-pattern analysis system integrated within an integrated circuit die in accordance with an embodiment of the present invention.

Referring now to FIG. 2, a schematic representation is illustrated of a floor plan of a real-time data-pattern analysis system 200 integrated within an integrated circuit die 202 in another embodiment of the present invention. The real-time data-pattern analysis system 200 comprises a non-volatile memory core 204 such as a flash memory core array accessed through a high-bandwidth massively parallel data bus 206, which is used to transfer the data pattern 106 of FIG. 1 from the non-volatile memory core 204 to a periphery circuit module 208 containing a computational unit 210. The integrated circuit die 202 includes a charge pump module 212 for providing adequate voltage levels to support the non-volatile memory core 204 and the periphery circuit module 208.

The integrated circuit die 202 may contain one or more instances of the non-volatile memory core 204 as appropriate depending on the storage capacity needed for the real-time data-pattern analysis system 200. In some applications, for example, one or two instances of the non-volatile memory core 204 may be needed to store numerous instances of the data pattern 106 of FIG. 1, which may amount to a total required storage capacity of 600 megabits. Higher storage capacities are achievable by increasing the number of instances of the non-volatile memory core 204.

In another embodiment of the present invention, the high-bandwidth massively parallel data bus 206 is at least 256 bits wide. Assuming that the non-volatile memory core 204 is implemented using high-speed NOR flash memory technology, the 256 bits may be read in burst mode in approximately 30 nanoseconds, representing an effective data transfer rate exceeding 1 gigabyte per second. Similarly, 1024 bits may be read in approximately 100 ns, yielding an equivalent data transfer rate exceeding 1 gigabyte per second. Thus, the implementation of a high-bandwidth massively parallel data bus 206 within the integrated circuit die 202 enables the implementation of 1 gigabyte per second data transfer rates between the non-volatile memory core 204 and the periphery circuit module 208 containing the computational unit 210.

The data pattern 106 of FIG. 1 enters the periphery circuit module 208 through a memory buffer 214, and is routed to the computational unit 210 through a high-bandwidth data bus 216. In one embodiment of the invention, the memory buffer 214 includes circuitry for implementing error correction code, a method of correcting for read errors. A high-voltage module 218 provides additional power conditioning for components in the integrated circuit die 202, and a microcontroller state machine module 220 provides chip control and external chip interface functions. Low-voltage power conditioning circuitry may be integrated within the microcontroller state machine module 220.

Figure 3:
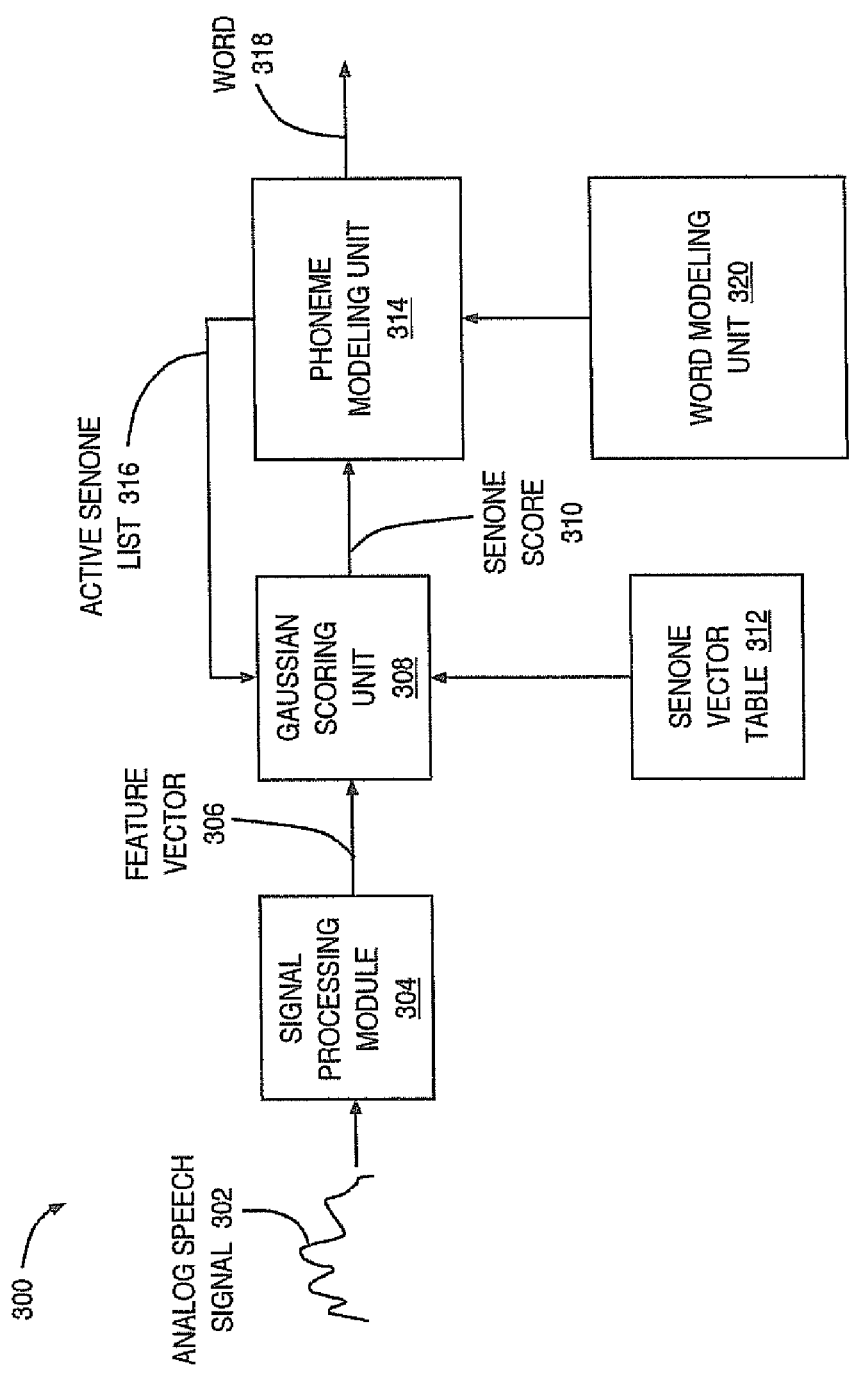
FIG. 3 is a flow chart illustrating a method of speech recognition based on the Hidden Markov Model (HMM) used in accordance with an embodiment of the present invention.

Referring now to FIG. 3, a flow chart illustrates a method of speech recognition 300 based on the Hidden Markov Model (HMM) used in still another embodiment of the present invention. It should be noted that speech recognition systems based on Hidden Markov Models have a relatively high accuracy compared with other techniques. In such systems, the basic phonetic units ("phones") are described using Hidden Markov Models constructed of sub-phonetic units ("senones"). The accuracy of the speech recognition system is thus to a large extent determined by the number of senones that can be compared to an utterance in a given period of time. This process of senone scoring is typically the computational bottleneck of speech recognition systems.

An analog speech signal 302 enters a signal processing module 304, where it is converted into a feature vector 306, which is a digital representation of the analog speech signal 302. Mel-Frequency Cepstral Coefficients, coefficients that collectively represent the short-term power spectrum of a sound, may be employed to represent the analog speech signal 302. Only the first 13 cepstral coefficients may be required.

The feature vector 306 is presented to a Gaussian scoring unit 308, which is used to calculate a senone score 310 representing the mathematical distance or best fit between the feature vector 306 and one or more senones stored in a senone vector table 312. Information stored in the senone vector table 312 includes the means, covariances, and weighting factors for each vector component of each mixture of the senone model. In the known state of the art, the senone vector table 312 is stored in a separate DRAM chip (not shown), which is uploaded with the senone data during the system power-up, and it is lost when the system is powered down. A phoneme modeling unit 314 provides an active senone list 316 to the Gaussian scoring unit 308. The active senone list 316 determines the selection of senones stored in the senone vector table 312 that needs to be compared to the feature vector 306.

There are additional stages that are used to recognize a word 318. The senone score 310 is routed to the phoneme modeling unit 314. A phoneme is the smallest segmental unit of sound needed to form meaningful contrasts between utterances. In the phoneme modeling unit 314, sequential senones are used to determine the most likely phoneme. Similarly, in a word modeling unit 320, sequential phonemes are used to determine the most likely selection of the word 318.

Figure 4:
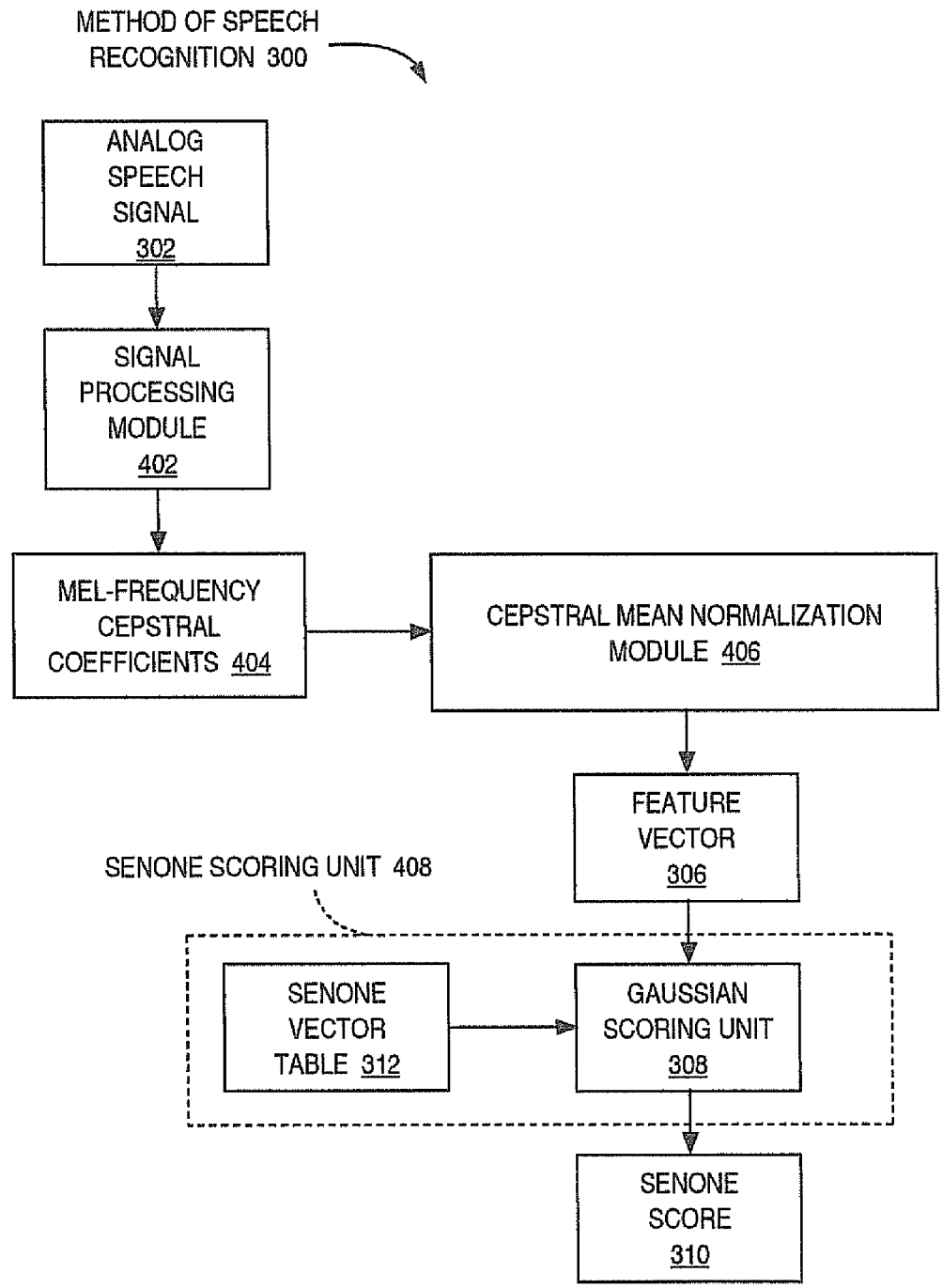
FIG. 4 is a flow chart illustrating further details of the front end of the method of speech recognition of FIG. 3.

Referring now to FIG. 4, a flow chart illustrates further details of the front end of the method of speech recognition 300 of FIG. 3. The analog speech signal 302 is processed by a signal processing module 402 which outputs Mel-Frequency Cepstral coefficients 404. A Cepstral mean normalization module 406 compensates for distortion from the microphone and from environmental acoustics, leading to the creation of the feature vector 306. A senone scoring unit 408 incorporating the senone vector table 312 and the Gaussian scoring unit 308 employs the feature vector 306 to compute a senone score 310.

Figure 5:
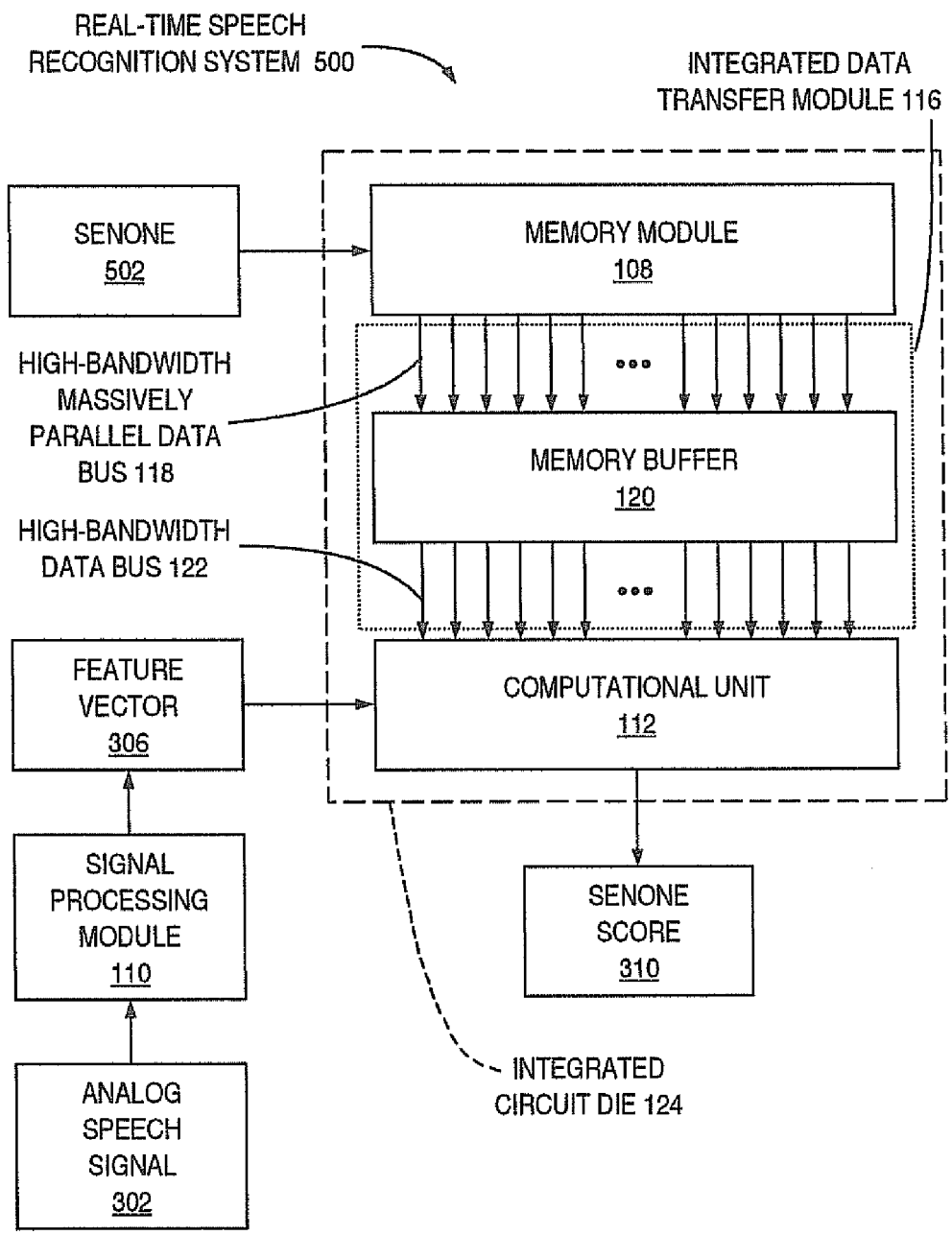
FIG. 5 is a schematic block diagram illustrating a real-time speech recognition system based on the a real-time data-pattern analysis system of FIG. 1 in accordance with an embodiment of the present invention.

Referring now to FIG. 5, a schematic block diagram illustrates a real-time speech recognition system 500 based on the real-time data-pattern analysis system 100 of FIG. 1 used in a further embodiment of the present invention. The architecture of the real-time speech recognition system 500 is optimized to provide real-time (approximately 10 ms frame) analysis of the analog speech signal 302 by comparing the feature vector 306 originating from the analog speech signal 302 to a senone 502 stored in the memory module 108, which stores the senone vector table 312 of FIG. 3.

The real-time speech recognition system 500 may include the signal processing module 110 for converting the analog speech signal 302 to the feature vector 306. Signal processing functions carried out by the signal processing module 110 may include analog-to-digital conversion, conversion from the time domain to the frequency domain, and/or any other signal manipulation that results in the appropriate conversion of the analog speech signal 302 into the feature vector 306.

The computational unit 112 computes a comparison between feature vector 306 and the senone 502 stored in the memory module 108, producing the senone score 310 that quantifies the best fit between the feature vector 306 and the senone 502. In performing such comparison, the computational unit 112 must compare the feature vector 306 to a plurality of different variations of the senone 502 residing in the memory module 108. Thus, the computational unit 112 performs the function of the Gaussian scoring unit 308 of FIG. 3.

The transfer of the senone 502 from the memory module 108 to the computational unit 112 is implemented using the integrated data transfer module 116 which may include the high-bandwidth massively parallel data bus 118, the memory buffer 120, and the high-bandwidth data bus 122.

Use of the real-time speech recognition system 500 and the real-time data-pattern analysis system 200, shown in FIG. 2, can support such high data rates at a power consumption that can be sustained by portable devices such as a cell phone. The real-time speech recognition system 500 solves the storage problem by providing a memory module 108 capable of storing well in excess of 13,000 variations of the senone 502. Each variation of the senone 502 is stored in binary form in the memory module 108 provided in the integrated circuit die 124. A standard method of storing senone information is a vector having 39 components. Each component of the vector has 32 bits of resolution, and the senone 502 can be a mixture of 20 of these vectors. Considering the need to cover both male and female speech, storage requirements may be on the order of 650 megabits of information (the product of 13,000 senones, 39 components, 20 mixtures, 32 bits, and 2 codebooks), which is a capability that can be addressed by NOR flash memory. For real-time operation, comparison of the feature vector 306 to a plurality of variations of the senone 502 stored in the memory module 108 must be done in frames of 10 milliseconds. Reading the senone 502 out of the memory module 108 and getting it into the computational unit 112 requires very high data transfer rates. If the real-time speech recognition system 500 is implemented using NOR flash memory technology, 256 bits of information may be read in parallel in a burst mode taking 30 nanoseconds, representing a data transfer rate of 1 gigabyte per second which can support 8.5 millisecond frames.

Figure 6:
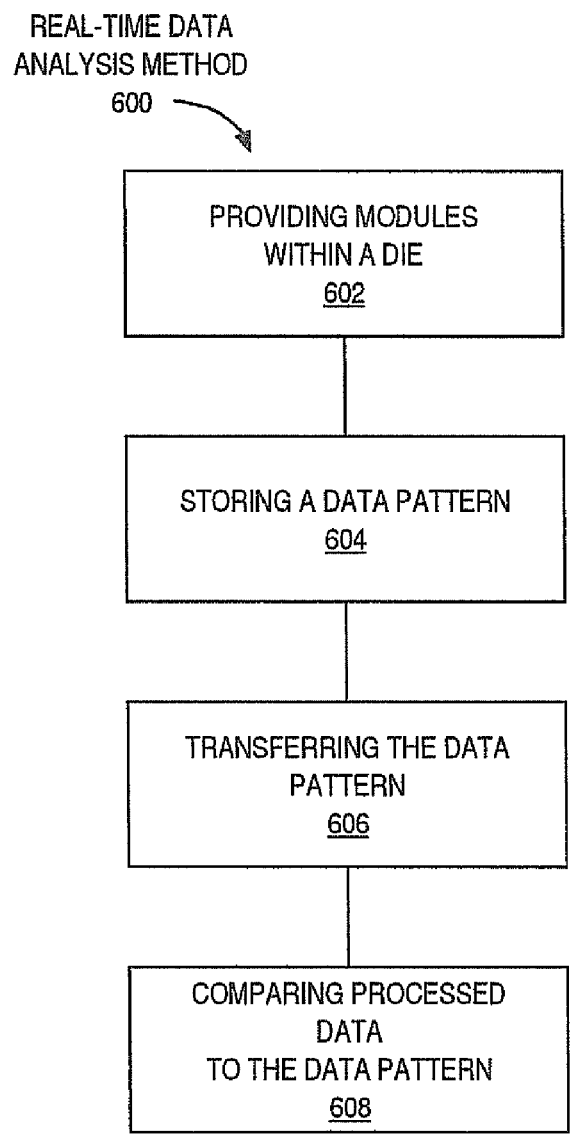
FIG. 6 is a flow chart of a method of operation of a real-time data-pattern analysis system in accordance with an embodiment of the present invention.

Referring now to FIG. 6, a flow chart illustrates a method 600 of operation of a real-time data-pattern analysis system in a still further embodiment of the present invention. The method 600 includes: providing a memory module, a computational unit, and an integrated data transfer module arranged within an integrated circuit die in a block 602; storing a data pattern within the memory module in a block 604; transferring the data pattern from the memory module to the computational unit using the integrated data transfer module in a block 606; and comparing processed data to the data pattern using the computational unit in a block 608.

Senone Scoring Units (SSUs) in Parallel with an SSU Controller

Figure 7:
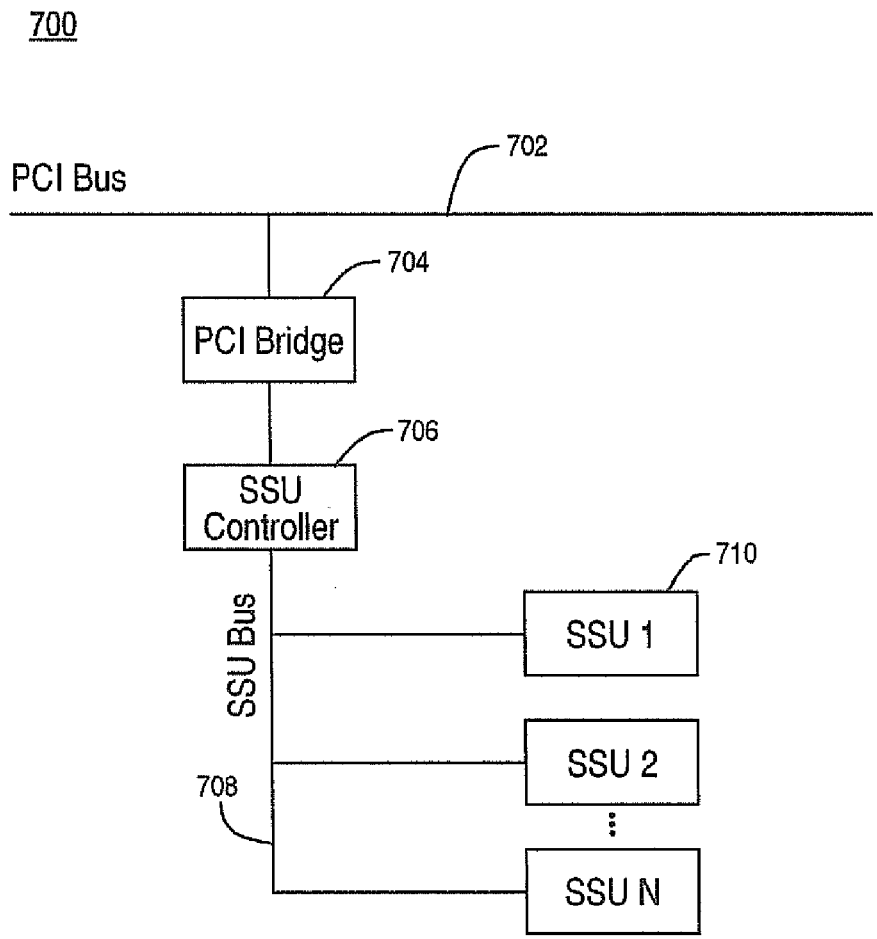
FIG. 7 is a schematic block diagram illustrating a senone scoring system in accordance with an embodiment of the present invention.

Referring now to FIG. 7, a schematic block diagram illustrates a senone scoring system 700 comprising a plurality of senone scoring units (SSU) used in parallel with a senone scoring unit (SSU) controller in an embodiment of the present invention. One embodiment of the senone scoring system 700 comprises a PCI bus 702, a PCI Bridge 704, an SSU Controller 706, an SSU Bus 708 and a plurality of SSUs 710. In one embodiment there may be 8-32 SSUs, although any number of SSUs is possible. As illustrated in FIG. 7, the SSUs 710 are each communicatively coupled in parallel to the SSU Controller using a dedicated SSU Bus 708. The SSU Controller 706 communicates with a system CPU (not shown) using one of the system buses, which in the embodiment illustrated in FIG. 7, is a PCI bus 702. Other embodiments may use other system buses, of which a USB bus is an example. As discussed below, a preferred embodiment comprises an SSU Controller communicating on a memory bus.

Utilizing a plurality of SSUs 710 connected in parallel with an SSU Controller 706 allows many senone scoring requests to be processed simultaneously, resulting in a dramatic performance improvement over the use of a single senone scoring unit. For instance, rather than waiting for a single senone scoring request to be processed by one SSU before starting the next, the plurality of SSUs 710 of FIG. 7 could receive and process a plurality of senone scoring requests simultaneously. For example, in an exemplary embodiment, there are 32 SSUs 710 connected in parallel to an SSU Controller, with the ability to simultaneously receive and timely process 32 senone scoring requests simultaneously. In other words, 32 SSUs 710 working in parallel effectively increases the processing speed by a factor of 32 as compared with a single SSU. As discussed below, the SSU Controller 706 keeps track of the senone scoring requests as they come in and directs senone scoring request commands and the data stream portions to the individual SSUs 710. Further, the SSU Controller 706 is a gateway to the system bus (i.e. the Input/Output bus or memory bus).

In an exemplary embodiment of the present invention, an SSU Controller 706 carries out some or all of the following functions: queuing the senone scoring requests, allocating or associating the senone scoring requests to a specific SSU 710, caching senone scores received from the SSUs 710 to be sent back to the CPU, and caching observation vector information (provided by the system) to be passed to the appropriate SSU 710. In queuing the senone scoring requests, the senone scoring requests may refer to an entire senone or to only parts of a senone (i.e., mixture components of a senone). In addition to queuing the senone scoring requests, corresponding data stream portions are also cached in the SSU Controller 706.

The SSU Controller 706 tracks the scoring requests as they come in, and allocates each request and corresponding data stream portion to an available SSU 710 configured to handle the specific senone scoring request. The SSU Controller 706 therefore controls which SSUs 710 are being used and what senone requests they are performing. The SSU Controller 706 will track which SSU 710 a particular senone request has been sent to. After an SSU 710 determines a senone score based on the data stream portion and corresponding senone scoring request, the senone score is forwarded back to the SSU Controller 706, and the SSU 710 is returned to the available pool of SSUs 710 to receive a new senone scoring request. These individual senone scores are cached by the SSU Controller 706 and eventually sent back to the host system in the correct order or with an identification tag attached.

In another embodiment of the present invention, the SSUs 710 can be configured to hold identical senone information or can store different senones in different SSUs 710. For example, all of the SSUs 710 in one embodiment may have the same library of senones, while in another embodiment; each SSU 710 may have a different library of senones. Assume for illustrative purposes an SSU 710 has a library capacity of 20,000 senones. If a particular library has fewer than 20,000 senones, then each SSU 710 in an embodiment may hold the same library of senones, allowing parallel processing of senone requests. Or, if the library contained 200,000 senones, then the library would be divided among for example 10 SSUs 710. The SSU Controller 706 utilizes configuration information when allocating a senone scoring request to a specific SSU 710 that contains that particular senone. The SSU configuration information will allow the SSU Controller 706 to ascertain what senone library or portion of a senone library a particular SSU 710 contains.

Figure 8:
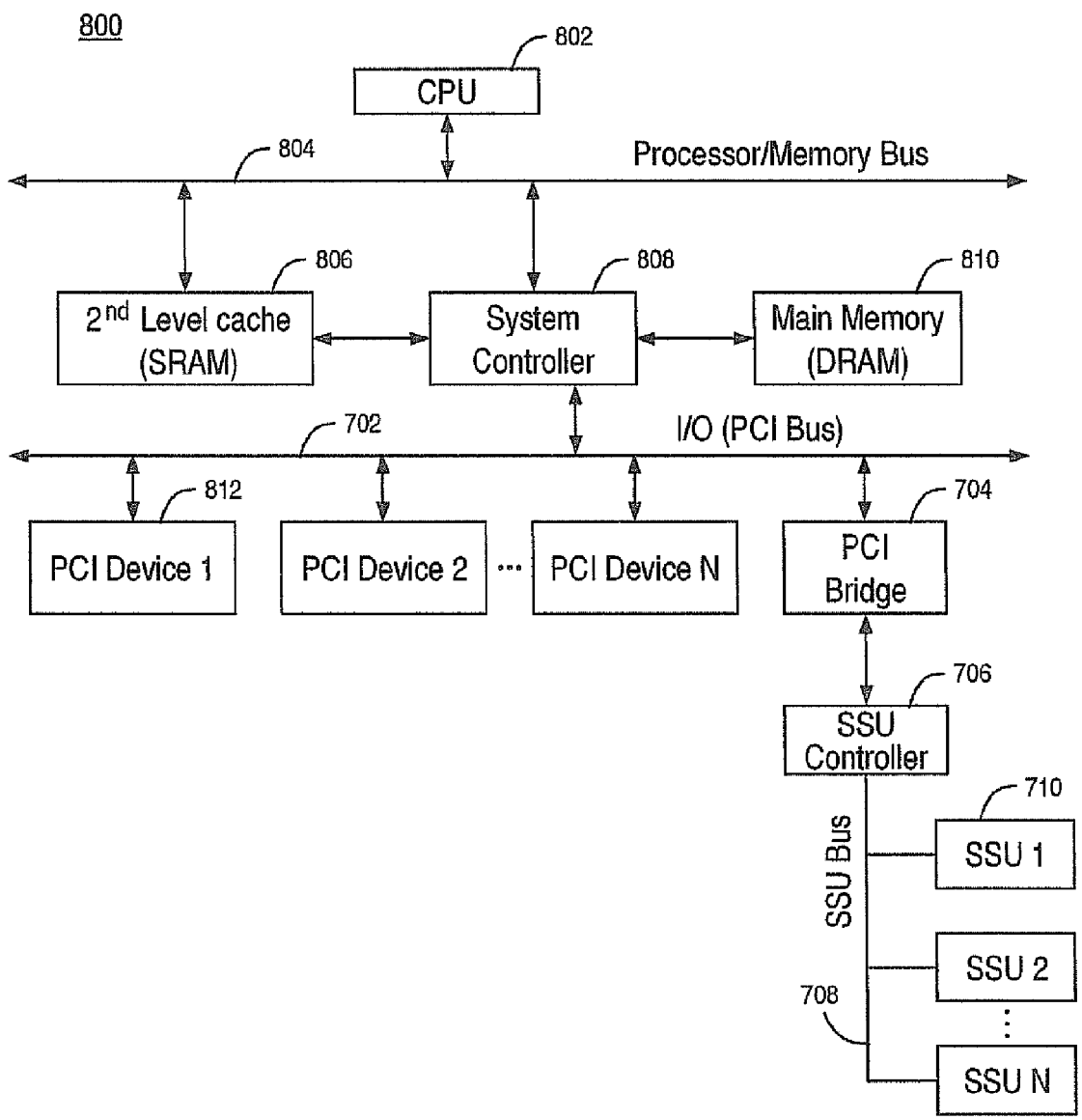
FIG. 8 is a schematic block diagram illustrating a standard computer architecture implementing a senone scoring system in accordance with an embodiment of the present invention.

Referring now to FIG. 8, a schematic block diagram illustrates a standard computer architecture 900 implementing a senone scoring system 700 comprising a plurality of senone scoring units (SSUs) 710 used in parallel with a senone scoring unit (SSU) controller 706 in an embodiment of the present invention. One embodiment of the standard computer architecture 900 implementing a senone scoring system 700 comprises: a central processing unit (CPU) 802, a processor/memory bus 804, a 2nd Level cache (SRAM) 806, a System Controller 808, a Main Memory (DRAM) 810, an I/O (PCI Bus) 702, a plurality of PCI Devices 812, a PCI Bridge 704, an SSU Controller 706, an SSU Bus 708, and a plurality of SSUs 710.

As illustrated in FIG. 8, an SSU Controller 706 is communicatively coupled to an I/O Bus 702, in one embodiment a PCI bus, and communicates with both the System Controller 808 and the SSUs 710. In another embodiment the SSU Controller 706 is communicatively coupled to the system memory bus 804. A preferred embodiment would have the SSU Controller 706 coupled to the system memory bus 804. As described above, the SSUs 710 are used to accelerate the senone scoring portion (acoustic modeling) of the speech recognition process. An SSU Controller 706 and plurality of SSUs 710 can also be used to accelerate other processes that depend on comparing an incoming data stream to a library of data, such as image processing and handwriting recognition. In other words, rather than senone scoring units and a senone scoring unit controller, an embodiment may contain data-pattern analysis units and a data-pattern analysis unit controller, as discussed above and illustrated in FIGS. 1 and 2, for simultaneous data-pattern processing of data stream portions.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for real-time data-pattern analysis, the method comprising:
   receiving, from an external processing unit, and queuing at least one data-pattern analysis request with a data-pattern analysis unit controller;
   receiving and storing at least one data stream portion with the data-pattern analysis unit controller;
   selecting, with the data-pattern analysis unit controller, the at least one data-pattern analysis request from a queue of a plurality of data-pattern analysis requests and the at least one data stream portion;
   performing one or more data-pattern analyses based on the at least one data-pattern analysis request and the at least one data stream portion, wherein the data-pattern analyses are performed by a plurality of data-pattern analysis units that substantially simultaneously perform the one or more data-pattern analyses on the at least one data stream portion and other data stream portions based on corresponding selected data-pattern analysis requests for each of the plurality of data-pattern analysis units; and providing, with the data-pattern analysis unit controller, one or more data-pattern results to the external processing unit.

2. The method for real-time data-pattern analysis according to claim 1, wherein the at least one data-pattern analysis request and the at least one data stream portion are transmitted from the data-pattern analysis unit controller to a corresponding data-pattern analysis unit from the plurality of data-pattern analysis units.

3. The method for real-time data-pattern analysis according to claim 1, further comprising:

converting the at least one data stream portion into processed data using a signal processing module.

4. The method for real-time data-pattern analysis according to claim 3, wherein each of the data-pattern analysis units comprises a memory module, a computational unit, and an integrated data transfer module arranged within an integrated circuit die, and wherein the performing the data-pattern analysis comprises:

storing a data pattern in the memory module;

transferring the data pattern from the memory module to the computational unit using the integrated data transfer module; and comparing the processed data to the data pattern using the computational unit.

5. The method for real-time data-pattern analysis according to claim 4, wherein the comparing the processed data to the data pattern using the computational unit comprises generating one or more distance scores representative of the one or more data-pattern results.

6. The method for real-time data-pattern analysis according to claim 4, wherein the transferring the data pattern from the memory module to the computational unit using the integrated data transfer module comprises transferring the data pattern at data transfer rates exceeding 1 gigabyte per second.

7. The method for real-time data-pattern analysis according to claim 4, wherein the transferring the data pattern from the memory module to the computational unit using the integrated data transfer module comprises transferring the data pattern over a parallel data bus that is at least 256 bits wide.

8. The method for real-time data-pattern analysis according to claim 1, wherein a resulting one or more data-pattern results from each of the plurality of data-pattern analysis units is transmitted to the data-pattern analysis unit controller, wherein the data-pattern analysis unit controller queues the resulting one or more data-pattern results in at least one of a proper order and with an identification tag before providing the resulting one or more data-pattern results to the external processing unit.

9. The method for real-time data-pattern analysis according to claim 1, wherein the one or more data-pattern analyses comprise at least one of:

senone scoring for speech recognition processing;

image processing; and handwriting recognition.

10. A system for real-time data-pattern analysis, the system comprising:

a data-pattern analysis unit controller;

a plurality of data-pattern analysis units communicatively coupled in parallel to the data-pattern analysis unit controller, wherein the data-pattern analysis unit controller is configured to:

receive at least one data-pattern analysis request from an external processing unit and at least one data stream portion;

select the at least one data-pattern analysis request and the at least one data stream portion; and perform one or more data-pattern analyses based the at least one data-pattern analysis request and the at least one data stream portion, wherein the data-pattern analyses are performed by a plurality of data-pattern analysis units that substantially simultaneously perform the one or more data-pattern analyses on the at least one data stream portion and other data stream portions based on corresponding selected data-pattern analysis requests for each of the plurality of data-pattern analysis units; and provide one or more data-pattern results to the external processing unit.

11. The system for real-time data-pattern analysis according to claim 10, further comprising:

a signal processing module configured to convert the at least one data stream portion into processed data.

12. The system for real-time data-pattern analysis according to claim 11, wherein each of the data-pattern analysis units comprises:

a memory module configured to store a data pattern;

a computational unit configured to compare the processed data to the data pattern; and an integrated data transfer module configured to transfer the data pattern from the memory module to the computational unit.

13. The system for real-time data-pattern analysis according to claim 12, wherein the memory module comprises a non-volatile memory core.

14. The system for real-time data-pattern analysis according to claim 10, further comprising:

a microcontroller state machine module.

15. The system for real-time data-pattern analysis according to claim 12, wherein the integrated data transfer module comprises a high-bandwidth massively parallel data bus and a memory buffer.

16. The system for real-time data-pattern analysis according to claim 12, wherein the integrated data transfer module comprises a parallel data bus that is at least 256 bits wide.

17. The system for real-time data-pattern analysis according to claim 12, wherein the computational unit is configured to compare the processed data to the data pattern to generate the one or more data-pattern results.

18. The system for real-time data-pattern analysis according to claim 12, wherein the integrated data transfer module is configured to transfer the data pattern from the memory module to the computational unit at data transfer rates exceeding 1 gigabyte per second.

19. The system for real-time data-pattern analysis according to claim 10, wherein the data-pattern analysis unit controller is configured to place the at least one data-pattern analysis request in a queue and store the at least one data stream portion.

20. The system for real-time data-pattern analysis according to claim 10, wherein the data-pattern analysis unit controller is configured to receive a resulting one or more data-pattern results from each of the plurality of data-pattern analysis units and to place the resulting one or more data-pattern results in at least one of a proper order and with an identification tag before providing the resulting one or more data-pattern results to the external processing unit.

21. The system for real-time data-pattern analysis according to claim 10, wherein the one or more data-pattern analyses comprise at least one of:
   senone scoring for speech recognition processing;
   image processing; and
   handwriting recognition.

22. A method for senone scoring, the method comprising:
   receiving, from an external processing unit, and queuing at least one senone scoring request with a senone scoring unit controller;
   receiving and storing at least one data stream portion with the senone scoring unit controller;
   selecting, with the senone scoring unit controller, the at least one senone scoring request from a queue of a plurality of senone scoring requests and the at least one data stream portion;
   calculating one or more senone scores based on the at least one senone scoring request and the at least one data stream portion, wherein the senone score calculations are performed by a plurality of senone scoring units that substantially simultaneously perform senone scoring on the at least one data stream portion and other data stream portions based on corresponding selected senone scoring requests for each of the plurality of senone scoring units; and
   providing, with the senone scoring unit controller, the one or more senone scores to the external processing unit.

23. The method for senone scoring according to claim 22, wherein the at least one senone scoring request and at least one data stream portion are transmitted from the senone scoring unit controller to a corresponding senone scoring unit from the plurality of senone scoring units.

24. The method for senone scoring according to claim 22, wherein a resulting one or more senone scores from each of the plurality of senone scoring units is transmitted to the senone scoring unit controller, wherein the senone scoring unit controller queues the resulting one or more senone scores in at least one of a proper order and with an identification tag before providing the resulting one or more senone scores to the external processing unit.

25. The method for senone scoring according to claim 22, wherein each of the senone scoring units comprises a memory module, a computational unit, and an integrated data transfer module arranged within an integrated circuit die, and wherein the performing the senone scoring comprises:
   converting the at least one data stream portion into processed data;
   storing a data pattern in the memory module;
   transferring the data pattern from the memory module to the computational unit using the integrated data transfer module; and
   comparing the processed data to the data pattern using the computational unit.

26. The method for senone scoring according to claim 25, wherein the transferring the data pattern from the memory module to the computational unit using the integrated data transfer module comprises transferring the data pattern at data transfer rates exceeding 1 gigabyte per second.

27. The method for senone scoring according to claim 25, wherein the transferring the data pattern from the memory module to the computational unit using the integrated data transfer module comprises transferring the data pattern over a parallel data bus that is at least 256 bits wide.

* * * * *